United States Patent
Lee et al.

(10) Patent No.: US 11,677,342 B2
(45) Date of Patent: Jun. 13, 2023

(54) METHOD AND DEVICE FOR DETECTING INITIAL POSITION OF ROTOR OF PERMANENT MAGNET SYNCHRONOUS MOTOR IN NO-LOAD ENVIRONMENT

(71) Applicant: KOOKMIN UNIVERSITY INDUSTRY ACADEMY COOPERATION FOUNDATION, Seoul (KR)

(72) Inventors: Geun Ho Lee, Seongnam-si (KR); Dong Gil Kang, Seoul (KR); Soon Ho Kwon, Ansan-si (KR); Ji Hwan Park, Seoul (KR); Joon Ik Uhm, Guri-si (KR); Hee Sun Lim, Seoul (KR); Jung Jun Kim, Seoul (KR)

(73) Assignee: KOOKMIN UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 0 days.

(21) Appl. No.: 17/697,899

(22) Filed: Mar. 17, 2022

(65) Prior Publication Data

US 2022/0209691 A1    Jun. 30, 2022

Related U.S. Application Data

(63) Continuation of application No. PCT/KR2020/014605, filed on Oct. 23, 2020.

(30) Foreign Application Priority Data

Jan. 31, 2020   (KR) ................. 10-2020-0012220

(51) Int. Cl.
  *H02P 6/16*   (2016.01)
(52) U.S. Cl.
  CPC ............ *H02P 6/16* (2013.01); *H02P 2203/03* (2013.01); *H02P 2203/09* (2013.01); *H02P 2207/05* (2013.01)

(58) Field of Classification Search
  CPC .... H02P 6/16; H02P 2203/03; H02P 2203/09; H02P 2207/05; H02P 6/18; H02P 21/32
  See application file for complete search history.

(56) References Cited

U.S. PATENT DOCUMENTS

2014/0285125 A1* 9/2014 Kato .................... H02P 21/141
                                                       318/721
2020/0295688 A1* 9/2020 Yoshikawa ............. H02P 21/18

FOREIGN PATENT DOCUMENTS

JP   2013046424 A   *  3/2013   .............. H02P 21/20
JP   2013-90546 A      5/2013
KR   10-2017-0126639 A   11/2017

OTHER PUBLICATIONS

Dong-Uk Kim et al., Speed Controller Transition Method for I-F Operation and Sensorless Operation of Permanent Magnet Synchronous Motor, thesis, Jun. 18, 2019, 9 pages, Division of Electrical Engineering, Hanyang University, ERICA Campus.

* cited by examiner

*Primary Examiner* — Muhammad S Islam
*Assistant Examiner* — Bradley R Brown
(74) *Attorney, Agent, or Firm* — Cybernetic Law PLLC; John Hocker

(57) ABSTRACT

A method for detecting an initial position of a rotor of a permanent magnet synchronous motor in a no-load environment can comprise the steps of: estimating a temporary initial position α' by means of aligning a d axis; measuring a first voltage command which is output by performing velocity control within predetermined velocity ranges with respect to the forward direction of a motor on the basis of the temporary initial position α'; measuring a second voltage command which is output by performing velocity control within the predetermined velocity range with respect to the reverse direction of the motor on the basis of the temporary initial position α'; calculating respective variations of the first voltage command and second voltage command, and calculating a compensation angle α"; and calculating an initial position α of the rotor on the basis of the sum of the temporary initial position α' and compensation angle α".

7 Claims, 5 Drawing Sheets

METHOD AND DEVICE FOR DETECTING INITIAL POSITION OF ROTOR OF PERMANENT MAGNET SYNCHRONOUS MOTOR IN NO-LOAD ENVIRONMENT

CROSS-REFERENCE TO RELATED APPLICATION

This application is a US Bypass Continuation Application of International Application No. PCT/KR2020/014605, filed on Oct. 23, 2020, and designating the United States, the International Application claiming a priority date of Jan. 31, 2020, based on prior Korean Application No. 10-2020-0012220, filed on Jan. 31, 2020, the disclosure of which is incorporated herein by reference in its entirety.

BACKGROUND

Technical Field

The present invention relates to a method and device for detecting an initial position of a rotor in a permanent magnet synchronous motor (PMSM) in a no-load environment, and more particularly, to technology for detecting an initial position of a rotor of a motor in a simpler and more accurate manner than a high frequency injection method used in the art through a process of calculating a compensation angle by controlling the motor in a forward direction and a reverse direction at a predetermined speed interval within a predetermined speed range.

Related Art

Currently, as an environmental problem is becoming global issue, the automobile market is changing from an internal combustion engine vehicle to an eco-friendly vehicle using a motor due to an increase in a demand for a fuel-efficient vehicle in the automobile market, a strict exhaust gas emission regulation, and the like.

Among motors, a permanent magnet synchronous motor (PMSM) has a good responsiveness, has an excellent output torque ratio compared to a torque weight due to a high output density, and has a good efficiency since there is no excitation winding for generating a magnetic flux, and accordingly, is widely used in an automobile system using a motor that requires an instantaneous torque control.

In general, a vector control technique is used to control such a motor. In the vector control technique, it is most important to know an accurate position of a rotor for coordinate transformation. Position sensors, such as a resolver, are used to detect rotor position information. Due to assembly tolerance between a position sensor and a motor, an offset angle occurs, which is called an initial rotor position. For high-performance vector control, this offset angle needs to be corrected and it is very important to accurately detect the initial rotor position.

There are some existing methods for detecting an initial position of a rotor. Representative examples include a method of measuring a counter-electromotive force by driving a target motor at a constant speed using a load motor in a driven environment and a method of detecting an initial position of a rotor using a difference in inductance by injecting a high frequency in a no-load environment.

However, large cost is required to construct a dynamo system environment for being driven and it takes time to install a dynamo to measure an initial position of each sample. A high-frequency injection method in a no-load environment uses a long execution time due to complexity of an algorithm and needs to experimentally select an amplitude and a frequency of a high frequency signal to be injected according to a design characteristic of a motor.

PRIOR ART DOCUMENT (Patent Document 1) Korean Patent Laid-Open Publication No. 10-2017-0126639 (2017.11.20)

SUMMARY

Technical Subject

The present invention relates to a novel initial rotor position detection method derived To solve the aforementioned issues and provides a method that may very precisely detect an initial position of a rotor while requiring a less execution time with a simpler algorithm than a high frequency injection method in a no-load environment and a device for implementing the method.

Solution

A method of detecting an initial position of a rotor of a permanent magnet synchronous motor (PMSM) in a no-load environment according to an example embodiment may include estimating a temporary initial position $\alpha'$ by aligning a d axis after I/F driving; measuring a first voltage command output by performing speed control within a predetermined speed range based on a forward direction of a motor based on the temporary initial position $\alpha'$; measuring a second voltage command output by performing speed control within the predetermined speed range based on a reverse direction of the motor based on the temporary initial position $\alpha'$; calculating a variation of each of the first voltage command and the second voltage command according to the speed control and calculating a compensation angle $\alpha''$ for the temporary initial position $\alpha'$ based on the variation; and calculating an initial position a of the rotor based on a sum of the temporary initial position $\alpha'$ and the compensation angle $\alpha''$.

The estimating of the temporary initial position $\alpha'$ may comprise fixing a temporary rotor position $\theta$ to be used for initial coordinate transformation to 0 degrees and then applying current to the d axis of the motor; driving the motor at a predetermined frequency and then gradually decreasing a size of the frequency and fixing again the temporary rotor position $\theta$ to 0 degrees; and determining an output value of a position sensor provided to the motor as the temporary initial position $\alpha'$ that is an error between the position sensor and the rotor.

The first voltage command may comprise a d-axis component Vd+ and a q-axis component Vq+ that are measured at a predetermined speed interval within the predetermined speed range, and the second voltage command may include a d-axis component Vd− and a q-axis component Vq− that are measured at a predetermined speed interval within the predetermined speed range.

The calculating of the compensation angle $\alpha''$ for the temporary initial position $\alpha'$ may comprise calculating the variation by cancelling a voltage error component and a voltage drop component of each of the first voltage command and the second voltage command.

The compensation angle $\alpha''$ may be calculated based on a difference between a variation of the d-axis component Vd+ of the first voltage command and a variation of the d-axis component Vd− of the second voltage command and a difference between a variation of the q-axis component Vq+ of the first voltage command and a variation of the q-axis component Vq− of the second voltage command.

A device for detecting an initial position of a rotor of a PMSM in a no-load environment according to an example embodiment may include a memory configured to store at least one instruction; and at least one processor configured to execute the at least one instruction stored in the memory. The processor may execute the at least one instruction to thereby estimate a temporary initial position α' by aligning a d axis after I/F driving, measure a first voltage command output by performing speed control within a predetermined speed range based on a forward direction of a motor based on the temporary initial position α, measure a second voltage command output by performing speed control within the predetermined speed range based on a reverse direction of the motor based on the temporary initial position α', calculate a variation of each of the first voltage command and the second voltage command according to the speed control and calculate a compensation angle α" for the temporary initial position α' based on the variation, and calculate an initial position α of the rotor based on a sum of the temporary initial position α' and the compensation angle α".

The processor may execute the at least one instruction to thereby fix a temporary rotor position θ to be used for initial coordinate transformation to 0 degrees and then apply current to the d axis of the motor, drive the motor at a predetermined frequency and then gradually decrease a size of the frequency and then fix again the temporary rotor position θ to 0 degrees, and determine an output value of a position sensor provided to the motor as the temporary initial position α' that is an error between the position sensor and the rotor.

The processor may execute the at least one instruction to thereby calculate the variation by cancelling a voltage error component and a voltage drop component of each of the first voltage command and the second voltage command.

The processor may execute the at least one instruction to thereby calculate the compensation angle α" based on a difference between a variation of the d-axis component Vd+ of the first voltage command and a variation of the d-axis component Vd− of the second voltage command and a difference between a variation of the q-axis component Vq+ of the first voltage command and a variation of the q-axis component Vq− of the second voltage command.

Meanwhile, according to an example embodiment, there may be provided a computer-readable record medium storing a program to computer-implement the method.

DETAILED DESCRIPTION

Figure 1:
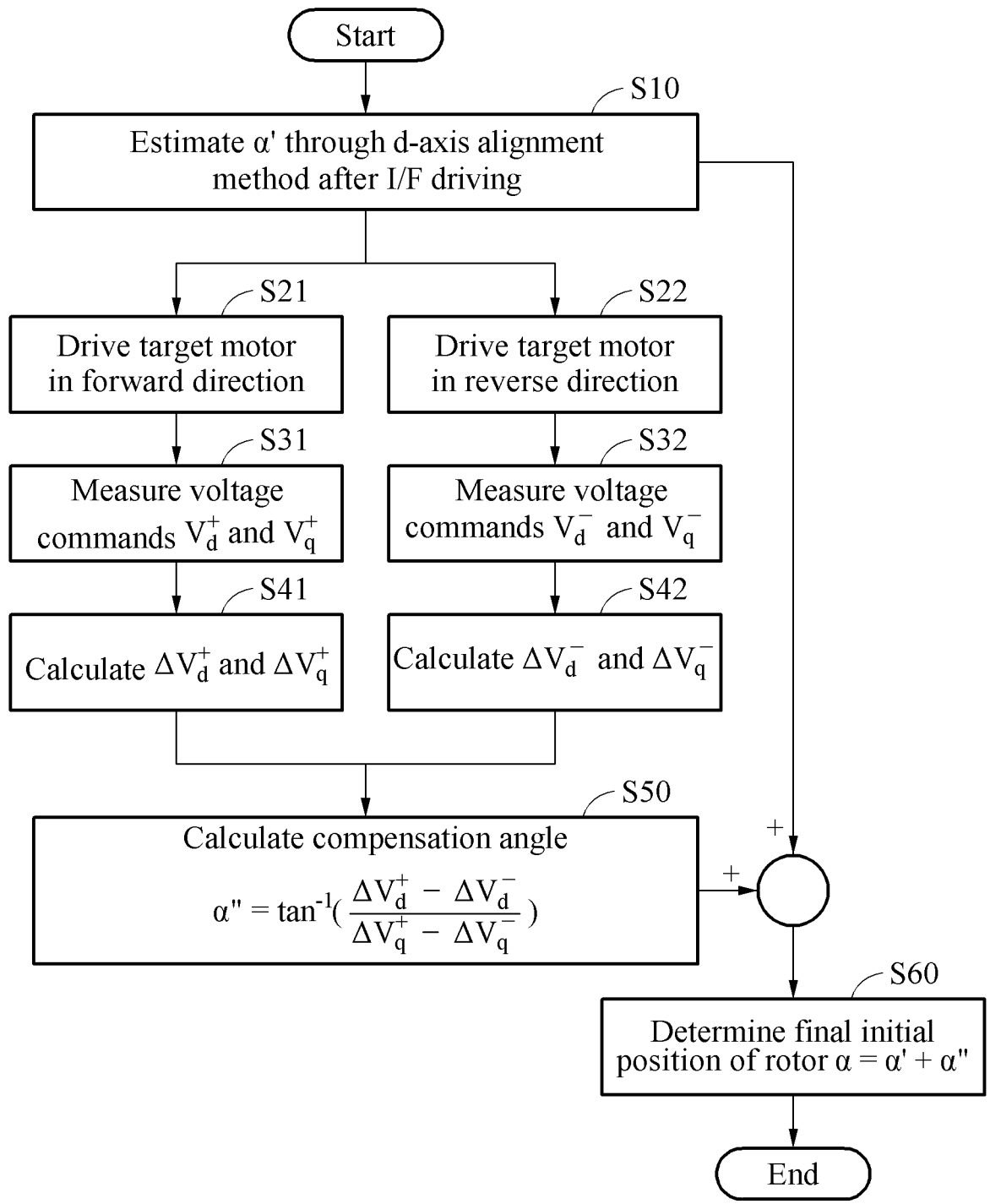
FIG. 1 is a flowchart illustrating a method of detecting an initial position of a rotor of a permanent magnet synchronous motor (PMSM) in a no-load environment according to an example embodiment.

Terms used herein are briefly described and the present invention is described in detail.

Although the terms used herein use currently widely used general terms as possible that are selected into consideration of functions in the present invention, they may vary depending on the intent or precedent of one of ordinary skill in the art, the emergence of new technology, and the like. In addition, in a specific case, there is a term arbitrarily selected by the applicant. In this case, the meaning thereof will be described in detail in a corresponding description portion of the invention. Therefore, the term used herein should be defined based on the meaning of the term and the overall content of the present invention rather than a simple name of the term.

When it is described in the overall specification that a portion "comprises/includes" a predetermined component, it represents that the portion may further include another component rather than excluding the other component unless clearly stated otherwise.

Also, a term, such as "processor" described herein, may represent a unit for processing at least one function or operation, which may be implemented as hardware or a combination of hardware and software.

In the following, example embodiments are described in detail with reference to the accompanying drawings such that one of ordinary skill in the art to which the present invention pertains may easily carry out the example embodiments. However, the present invention may be implemented in various different forms and is not limited to the example embodiments. To clearly explain the present invention, a portion irrelevant to the description is omitted in the drawings and like reference numerals refer to like elements throughout the present specification.

Hereinafter, the present invention is described in detail with reference to the accompanying drawings.

Figure 2:
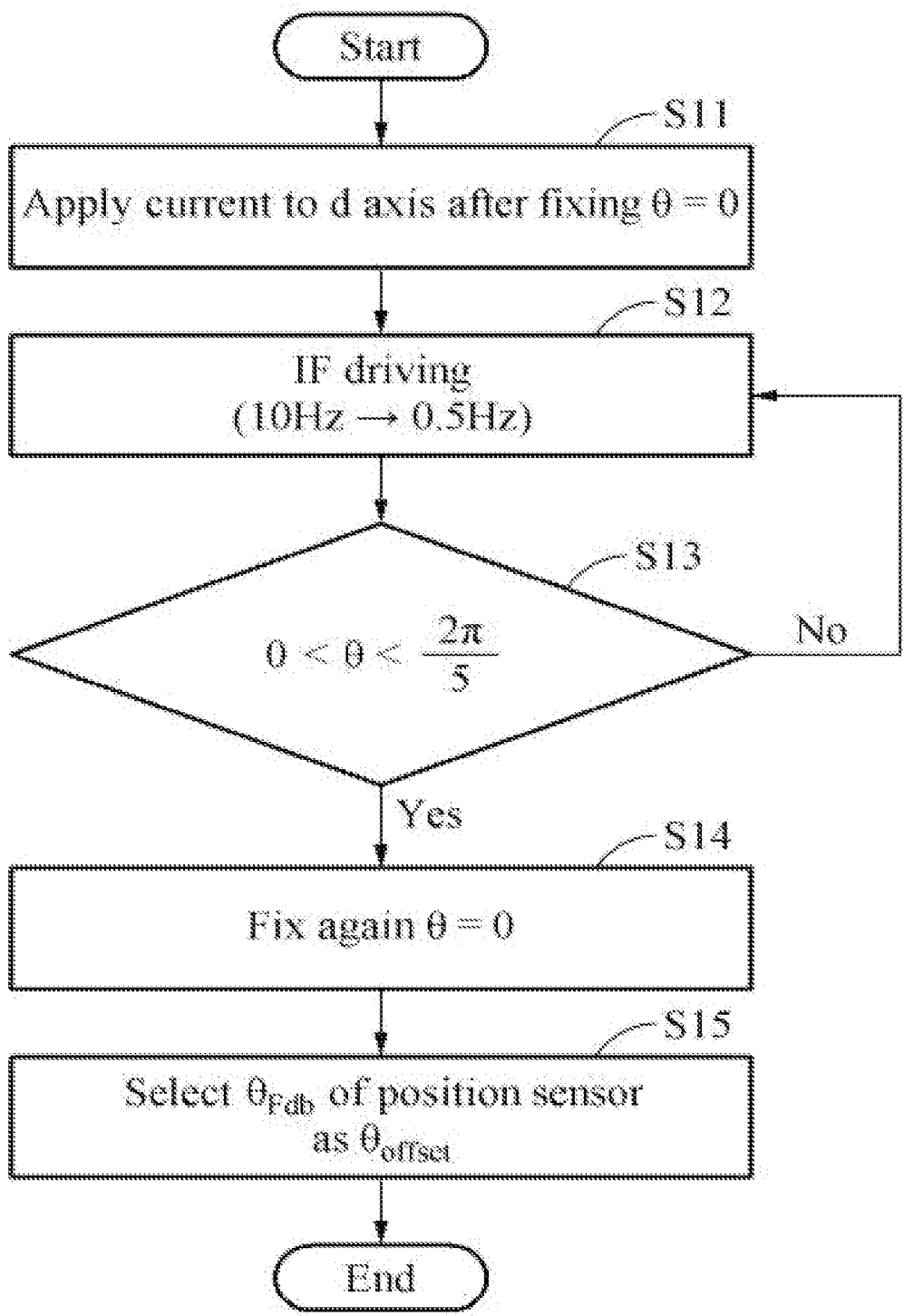
FIG. 2 is a flowchart illustrating an algorithm of a d-axis alignment method for estimating a temporary initial position α' according to an example embodiment.

FIG. 1 is a flowchart illustrating a method of detecting an initial position of a rotor of a permanent magnet synchronous motor (PMSM) in a no-load environment according to an example embodiment, and FIG. 2 is a flowchart illustrating an algorithm of a d-axis alignment method for estimating a temporary initial position α' according to an example embodiment.

Referring to FIG. 1, an initial position detection method of a rotor according to an example embodiment includes operation S10 of estimating a temporary initial position α', operations S21 and S31 of measuring a first voltage command by driving a motor based on a forward direction, operations S22 and S32 of measuring a second voltage command by driving the motor based on the forward direction, operations S41 and S42 of calculating a variation of each voltage command measured based on the forward direction and a reverse direction, operation S50 of calculating a compensation angle α", and operation S60 of determining a final initial position a of the rotor based on the temporary initial position α' and the compensation angle α". Here, in operations S21 and S31 of measuring the first voltage command and operations S22 and S32 of measuring the second voltage command, the voltage command in each direction is measured by controlling a speed at equal intervals (e.g., interval of 50 rpm) within a predetermined speed range (e.g., 50 rpm to 200 rpm).

In operation S10 of estimating the temporary initial position α' according to the example embodiment, a d-axis alignment method after I/F driving is used for smooth speed control. Here, the d-axis alignment method after I/F driving refers to a method that determines a difference between output values of a position sensor and the rotor aligned by driving the motor while applying d-axis current and changing a frequency.

Referring to FIG. 2, the d-axis alignment method after I/F driving fixes a temporary rotor position θ to be used for initial coordinate transformation to 0 degrees and then applies current to the d axis of the motor (S11). After applying the current, the I/F driving method drives the motor at a frequency of about 10 hertz (Hz), lowers a frequency again to 0.5 Hz, and makes the temporary rotor position θ become 0 degrees (S12, S13, and S14). In this manner, if the motor is forcibly started and driven at a very slow frequency and then restrained while the d-axis current is applied again, the rotor is aligned by magnetic flux caused by stator current. The rotor current is applied with respect to the d-axis current set based on a temporary angle and the rotor is also aligned with respect to the d-axis current. Therefore, an output value of the position sensor is determined as the temporary initial position α' that is an error between the position sensor and the rotor (S15).

As described above, in the case of using the aforementioned d-axis alignment method after I/F driving in estimating the temporary initial position α', it is possible to reduce a d-axis alignment error occurring due to characteristics that are present differently for each motor, such as a cogging torque and inertia, which differs from a simple d-axis alignment method.

When controlling a speed of the motor by applying the estimated temporary initial position α' according to an example embodiment, a voltage equation is represented as the following Equation 1. Here, a q-axis current component present in Equation 1 refers to a component by a minimum torque required for no-load driving by inertia, friction, and the like, and has a very small value.

$$V_d = -\omega \phi_f \sin \alpha'' - i_q \omega (L_1 + L_2 \cos 2\alpha'')$$

$$V_q = \omega \phi_f \cos \alpha'' + i_q (R_s - L_2 \omega \sin 2\alpha'') \quad \text{[Equation 1]}$$

In Equation 1, $V_d$ denotes a d-axis voltage command, $V_q$ denotes a q-axis voltage command, ω denotes a motor rotor speed, $\phi_f$ denotes a magnetic flux by a permanent magnet, $L_1$ and $L_2$ denote inductance constants, $R_s$ denotes a stator resistance, $i_q$ denotes q-axis current, and α'' denotes a compensation angle.

In addition to components of the voltage equation of Equation 1, a voltage drop component of a switching element occurring when the q-axis current flows and a voltage error component by a dead time needs to be considered. If q-axis current of $i_q^+$ flows through forward driving at a speed of $\omega^+$ in operations S21 and S31 of measuring the first voltage command, the voltage equation is derived as shown in the following Equation 2.

$$V_d^+ = -\omega^+ \phi_f \sin \alpha'' - i_q^+ \omega^+ (L_1 + L_2 \cos 2\alpha'') + V_{r\text{-}d} + V_{dead\text{-}d}$$

$$V_q^+ = \omega^+ \phi_f \cos \alpha'' + i_q^+ (R_s - L_2 \omega + \sin 2\alpha'') + V_{r\text{-}q} + V_{dead\text{-}q} \quad \text{[Equation 2]}$$

In Equation 2, $V_r$ denotes the voltage drop component by the switching element and $V_{dead}$ denotes the voltage error component by the dead time. In detail, $V_{dead}$ denotes the voltage error component caused by the dead time that is a forcibly injected time such that two switches, upper and lower switches, may remain off between an on-timing and an off-timing of the upper and lower switches.

Forward driving is performed at a speed with intervals of $\omega^+ + \Delta\omega$, $\omega^+ + 2\Delta\omega$, ..., by considering the voltage equation of Equation 2 and the voltage command is measured. For example, when performing measurement within the range of 500 rpm to 700 rpm, it is the same as measuring at intervals of 50 rpm, such as 500 rpm, 550 rpm, . . . 700 rpm.

In contrast, if q-axis current of $i_q^-$ flows when reverse driving at the speed of $\omega^-$ in operations S22 and S32 of measuring the second voltage command, the voltage equation is expressed as the following Equation 3. Similar to the forward driving case, reverse driving is performed at a speed with intervals of $\omega^- - \Delta\omega$, $\omega^- - 2\Delta\omega$, ..., and the voltage command is measured. For example, when performing measurement within the range of −500 rpm to −700 rpm, it is the same as measuring at intervals of 50 rpm, such as −500 rpm, −550 rpm, . . . −700 rpm.

$$V_d^- = -\omega^- \phi_f \sin \alpha'' - i_q^- \omega^- (L_1 + L_2 \cos 2\alpha'') - V_{r\text{-}d} - V_{dead\text{-}d}$$

$$V_q^+ = \omega^+ \phi_f \cos \alpha'' + i_q^+ (R_s - L_2 \omega^+ \sin 2\alpha'') + V_{r\text{-}q} + V_{dead\text{-}q} \quad \text{[Equation 3]}$$

To cancel the voltage error component by the dead time and the voltage drop component by the switching element, a variation of the d-axis voltage command may be arranged as an equation for Δω based on a difference between voltage equations for the d-axis voltage command measured at different speeds, which is expressed as the following Equation 4.

$$\Delta V_d^+ = -\Delta\omega^+ \Phi_f \sin \alpha'' - \Delta i_q^+ \Delta\omega^+ (L_1 + L_2 \cos 2\alpha'') \quad \text{[Equation 4]}$$

In general, it may be assumed that variation $\Delta i_q$ of q-axis current required for acceleration by very small Δω under no-load driving condition is negligible. Therefore, the error component by the dead time and the voltage drop component by the switching element may be assumed to be the same regardless of the speed. Therefore, as shown in Equation 4, when a voltage difference at different speeds is acquired, it may be all cancelled and a voltage variation equation of Equation 4 may be derived.

If all voltage equations for the remaining voltage commands are arranged in the same manner as in Equation 4, a voltage equation of Equation 5 may be derived in operations S41 and S42 of calculating variations of the respective voltage commands.

$$\Delta V_d^+ = -\Delta\omega^+ \Phi_f \sin \alpha'' - \Delta i_q^+ \Delta\omega^+ (L_1 + L_2 \cos 2\alpha'')$$

$$\Delta V_q^+ = -\Delta\omega^+ \Phi_f \cos \alpha'' - \Delta i_q^+ (R_s - L_2 \Delta\omega^+ \sin 2\alpha'')$$

$$\Delta V_d^- = -\Delta\omega^- \Phi_f \sin \alpha'' - \Delta i_q^- \Delta\omega^- (L_1 + L_2 \cos 2\alpha'')$$

$$\Delta V_q^- = \Delta\omega^- \Phi_f \cos \alpha'' + \Delta i_q^- (R_s - L_2 \Delta\omega^- \sin 2\alpha'') \quad \text{[Equation 5]}$$

If $\Delta V_d^+ - \Delta V_d^-$ and $\Delta V_q^+ - \Delta V_q^-$ are acquired through Equation 5, they may be represented as in Equation 6. Here, since it is assumed that $\Delta i_q$ is negligibly small, it is canceled in a process of deriving Equation 6.

$$\Delta V_d^+ - \Delta V_d^- = -2\Delta\omega \Phi_f \sin \alpha''$$

$$\Delta V_q^+ - \Delta V_q^- = 2\Delta\omega \Phi_f \cos \alpha'' \quad \text{[Equation 6]}$$

The compensation angle α'' for the initial position according to Equation 6 in operation S50 of calculating the compensation angle α'' may be derived as in Equation 7.

$$\alpha'' = \tan^{-1}\left(\frac{\Delta V_d^+ - \Delta V_d^-}{\Delta V_q^+ - \Delta V_q^-}\right) \qquad \text{[Equation 7]}$$

That is, the compensation angle α" according to an example embodiment may be calculated according to Equation 7 based on a difference between a variation of the d-axis component $V_d^+$ of the first voltage command and a variation of the d-axis component $V_d^-$ of the second voltage command and a difference between a variation of the q-axis component $V_q^+$ of the first voltage command and a variation of the q-axis component $V_q^-$ of the second voltage command.

Once the temporary initial position α' and the compensation angle α" are determined through the aforementioned process, the final initial position α of the rotor may be calculated through a sum of the temporary initial position α' and the compensation angle α" as shown in the following Equation 8, in operation S60 of determining the initial position α of the rotor.

$$\alpha = \alpha' + \alpha'' \qquad \text{[Equation 8]}$$

Through this operation process, it is possible to accurately and precisely detect and determine the initial position of the rotor under a no-load environment condition without a separate dynamo system. Also, since the operation process is simpler than the existing widely used high frequency injection method, it is possible to reduce an amount of time used to determine the initial position of the rotor.

Figure 3A:
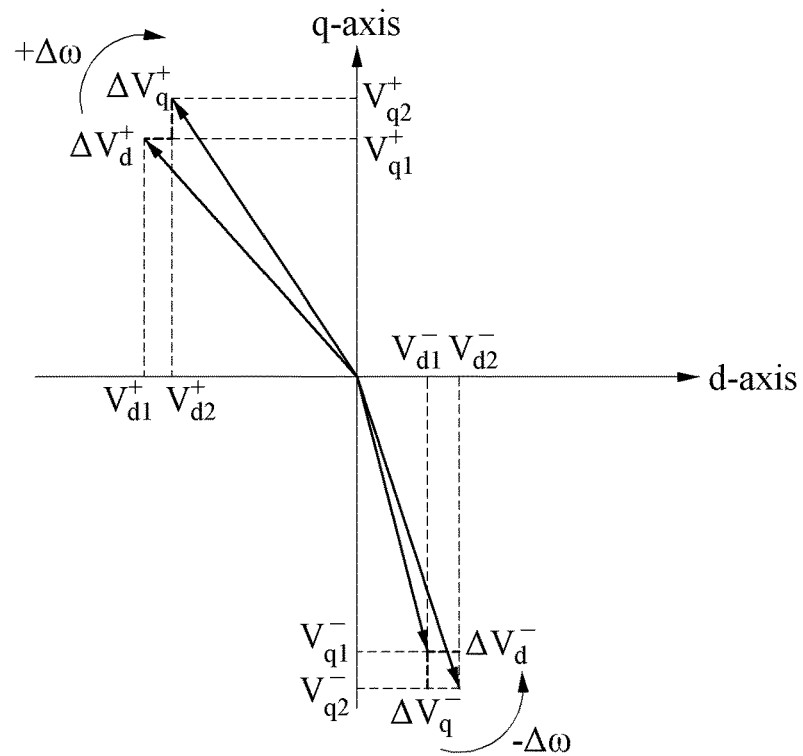
FIGS. 3A and 3B are graphs showing a compensation angle α" and a variation of a voltage command calculated when driving a motor in a forward direction and a reverse direction in a no-load environment according to an example embodiment.
Figure 3B:
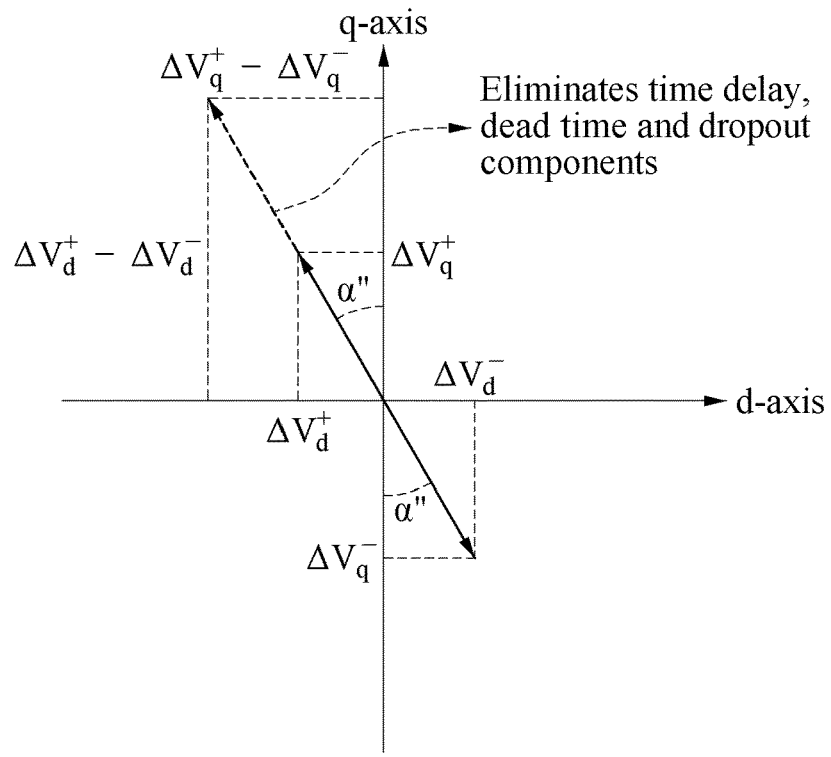

FIGS. 3A and 3B are graphs showing a compensation angle α" and a variation of a voltage command calculated when driving a motor in a forward direction and a reverse direction in a no-load environment according to an example embodiment.

According to an example embodiment, d-axis and q-axis voltages generated when driving the motor at two speed points during forward (second quadrant) driving and reverse (fourth quadrant) driving may be represented as vectors shown in FIGS. 3A and 3B. A portion indicated with a dotted line in FIG. 3B represents a difference between voltages generated at different speeds. Here, a component parallel to a vertical axis corresponds to the q-axis voltage and a component parallel to a horizontal axis corresponds to the d-axis voltage. Referring to FIG. 3A, it can be seen that, when driving the motor in the forward direction and driving the motor in the reverse direction, voltage vectors have different tendency with respect to a biased direction based on a horizontal-vertical axis.

Here, the voltage vector is closer to the vertical axis during the reverse driving rather than during the forward driving. It represents that, since the motor is driven at the same speed based on an absolute value during the forward driving and the reverse driving, a voltage vector with the same magnitude and difference of 180 degrees in phase only needs to be drawn, but a phase difference is deviated from 180 degrees due to effect of time delay and an error occurs in initial rotor position information when an initial position of a rotor is selected and driving in an opposite direction is performed. Therefore, if a phase error component by the time delay, a voltage error component by a dead time, and an error component by a voltage drop occurring in a hardware manner as shown in FIGS. 3A and 3B are eliminated, a magnitude and a phase of a voltage vector from which accurate rotor position information is known may be acquired. The voltage error components by the dead time and the voltage drop may be eliminated by acquiring a difference in voltage acquired when driving at different speeds in the same direction and the voltage error component by the time delay may be eliminated by acquiring a difference in voltage acquired when driving at the same speed in both directions.

Figure 4A:
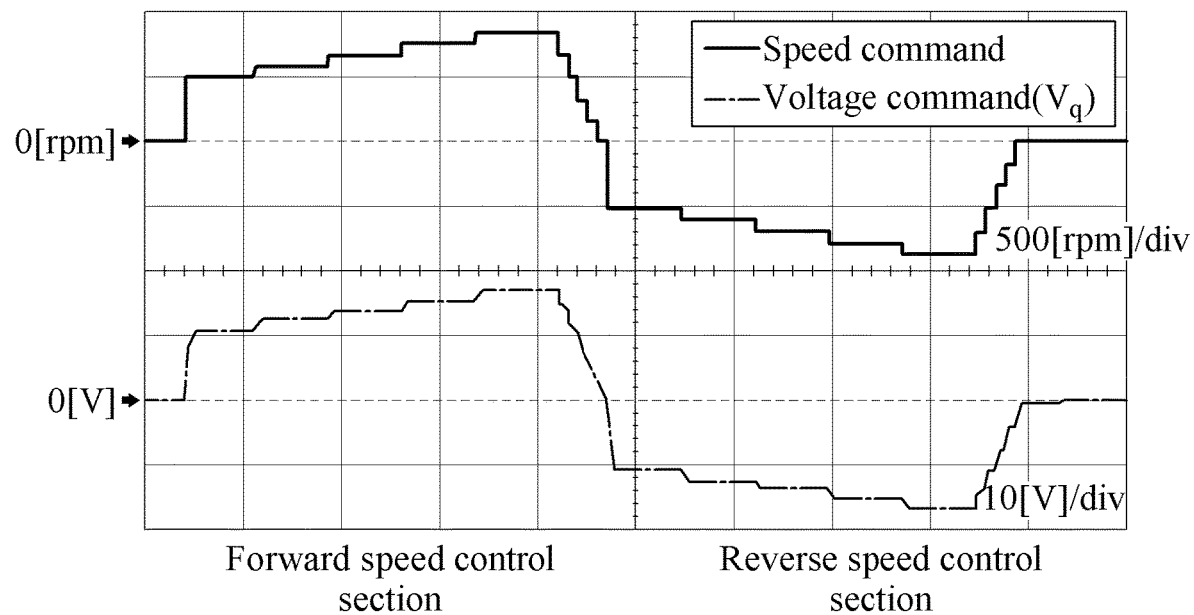
FIGS. 4A and 4B are graphs showing a waveform of a voltage command calculated when driving a motor in a forward direction and a reverse direction in a no-load environment according to an example embodiment.
Figure 4B:
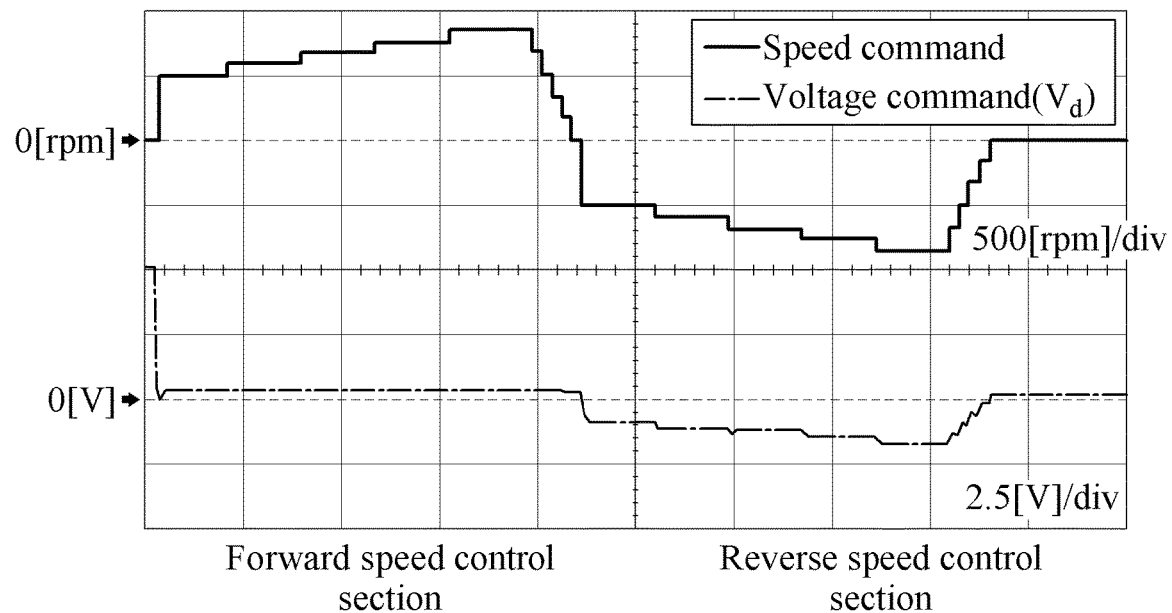

FIGS. 4A and 4B are graphs showing a waveform of a voltage command calculated when driving a motor in a forward direction and a reverse direction in a no-load environment according to an example embodiment.

Referring to FIGS. 4A and 4B, experimental waveforms for d-axis and q-axis voltage data acquired when driving the motor by changing the speed step-by-step in the forward direction and the reverse direction may be verified. Here, waveforms with a solid line represent speed commands and waveforms indicated with a dash-dotted line represent d-axis and q-axis voltage commands. Waveforms corresponding to a forward speed control section specified in FIGS. 4A and 4B show a change in d-axis and q-axis voltages output when driving the motor at five different speeds in the forward direction. When changing the speed over five stages, an output voltage gradually varies. Therefore, when a corresponding variation is calculated, voltage error components by a dead time and a voltage drop may be eliminated and a voltage component including position information of a rotor including a time delay component based on the forward direction may be acquired. Likewise, waveforms corresponding to a reverse speed control section show a change in d-axis and q-axis voltages output when driving the motor at five different speeds in the reverse direction. When changing the speed over five stages, an output voltage gradually varies. Therefore, when a corresponding variation is calculated, voltage error components by the dead time and the voltage drop may be eliminated and a voltage component including position information of the rotor including a time delay component based on the reverse direction may be acquired. Therefore, after an experiment corresponding to the entire section is completed, position information of the rotor in which the time delay component is eliminated may be acquired using finally calculated forward and reverse driving voltage components.

Figure 5:
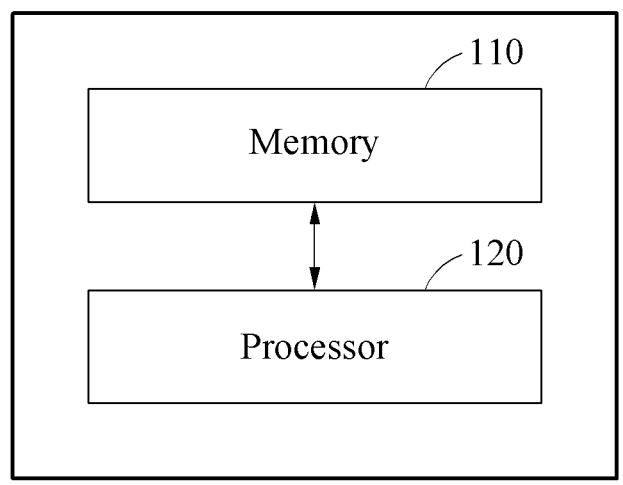
FIG. 5 is a block diagram illustrating a device for detecting an initial position of a rotor of a PMSM in a no-load environment according to an example embodiment.

FIG. 5 is a block diagram illustrating a device for detecting an initial position of a rotor of a PMSM in a no-load environment according to an example embodiment.

Referring to FIG. 5, a device 100 for detecting an initial position of a rotor of a PMSM in a no-load environment according to an example embodiment includes a memory 110 configured to store at least one instruction and at least one processor 120 configured to execute the at least one instruction stored in the memory 110. The processor 120 may execute at least one instruction to thereby estimate a temporary initial position α' by aligning a d axis after I/F driving, measure a first voltage command output by performing speed control within a predetermined speed range based on a forward direction of a motor based on the temporary initial position α, measure a second voltage command output by performing speed control within the predetermined speed range based on a reverse direction of the motor based on the temporary initial position α', calculate a variation of each of the first voltage command and the second voltage command according to the speed control and calculate a compensation angle α" for the temporary initial position α' based on the variation, and calculate an initial position α of the rotor based on a sum of the temporary initial position α' and the compensation angle α".

A method and system provided as an example embodiment may be applied for all electric systems, for example, a motor system for driving an electric vehicle in which a position sensor, such as a resolver and an encoder, is attached to a permanent magnet synchronous motor PMSM, an electric power steering (EPS) motor system, and an integrated starter generator (IS G) motor system.

Also, since it is a detection method in a no-load condition, an initial position may be precisely measured even under a condition incapable of generating a driven environment. By reducing a required experimental environment compared to existing methods and significantly simplifying an operation process of a detection algorithm with simple four-ruling operations, it is possible to remarkably reduce a work time for detecting an initial position and an execution time of a program. In addition, since a detection error of a measurement result value appears at a level of 2 bits to 3 bits based on a resolver, very high precision may be secured.

Description related to the method may apply to the device according to an example embodiment. Therefore, the same content related to the description of the method is omitted in relation to the device.

Meanwhile, according to an example embodiment, there may be provided a computer-readable record medium storing a program to computer-implement the method. That is, the aforementioned method may be written with a computer-executable program and may be implemented in a general-purpose digital computer that runs the program using computer-readable media. Also, a structure of data used for the method may be recorded in the computer-readable media using various methods. The media storing an executable computer program or code to perform various methods of the present invention should not be understood to include temporary targets such as carrier waves or signals.

The foregoing description of the present invention is provided as an example and one of ordinary skill in the art to which the present invention pertains may understand that modifications may be easily made in different forms without departing from the technical spirit or essential features of the present invention. Therefore, it should be understood that the example embodiments are illustrative in all respects and not restrictive. For example, each component described in a singular form may be implemented in a distributed manner. Likewise, components described as distributed may be implemented in a combined manner.

The scope of the present invention is indicated by the following claims rather than the detailed description and all changes or modifications derived from the meaning and the scope of the claims and the equivalents thereof should be construed as being included in the scope of the present invention.

EXPLANATION OF SYMBOLS

100: Device for detecting initial position of rotor
110: memory
120: processor

What is claimed is:

1. A method of detecting an initial position of a rotor of a permanent magnet synchronous motor (PMSM) in a no-load environment, the method comprising:
 fixing a temporary rotor position of a motor to 0 degrees;
 applying current to an axis of the motor;
 driving the motor at a predetermined frequency;
 determining whether a current rotor position of the motor is between zero and a predetermined value;
 when the current rotor position of the motor is determined to not be between zero and the predetermined value, determining a frequency for driving the motor to be lower than the predetermined frequency, driving the motor at the frequency for driving the motor, and re-determining whether a current rotor position of the motor is between zero and the predetermined value; and
 when a current rotor position of the motor is between zero and the predetermined value;
  fixing again a current rotor position to 0 degrees;
  estimating a temporary initial position, which is an error between a position sensor and the rotor, based on an output value of the position sensor provided to the motor;
  measuring a first voltage command output by performing speed control within a predetermined speed range based on a forward direction of a motor based on the temporary initial position,
  measuring a second voltage command output by performing speed control within the predetermined speed range based on a reverse direction of the motor based on the temporary initial position,
  calculating a variation of each of the first voltage command and the second voltage command according to the speed control and calculating a compensation angle for the temporary initial position based on the variation; and
  calculating an initial position of the rotor based on a sum of the temporary initial position and the compensation angle wherein
   the first voltage command includes a d-axis component and a q-axis component that are measured at a predetermined speed interval within the predetermined speed range, and
   the second voltage command includes a d-axis component and a q-axis component that are measured at a predetermined speed interval within the predetermined speed range.

2. The method of claim 1, wherein the calculating of the compensation angle for the temporary initial position comprises calculating the variation by cancelling a voltage error component and a voltage drop component of each of the first voltage command and the second voltage command.

3. The method of claim 1, wherein the compensation angle is calculated based on a difference between a variation of the d-axis component of the first voltage command and a variation of the d-axis component of the second voltage command and a difference between a variation of the q-axis component of the first voltage command and a variation of the q-axis on component of the second voltage command.

4. An electronic device comprising:
 a memory configured to store at least one instruction; and
 at least one processor configured to execute the at least one instruction stored in the memory,
 wherein the processor executes the at least one instruction to:
  fix a temporary rotor position of a motor to 0 degrees;
  apply current to an axis of the motor;
  drive the motor at a predetermined frequency;
  determine whether a current rotor position of the motor is between zero and a predetermined value;
  when the current rotor position of the motor is determined to not be between zero and the predetermined value: determine a frequency for driving the motor to be lower than the predetermined frequency, drive the motor at the frequency for driving the motor, and re-determine whether a current rotor position of the motor is between zero and the predetermined value; and
  when a current rotor position of the motor is between zero and the predetermined value;

fix again a current rotor position to 0 degrees;
estimate a temporary initial position, which is an error between a position sensor and the rotor, based on an output value of the position sensor provided to the motor;
measure a first voltage command output by performing speed control within a predetermined speed range based on a forward direction of a motor based on the temporary initial position,
measure a second voltage command output by performing speed control within the predetermined speed range based on a reverse direction of the motor based on the temporary initial position,
calculate a variation of each of the first voltage command and the second voltage command according to the speed control and calculate a compensation angle for the temporary initial position based on the variation, and
calculate an initial position of the rotor based on a sum of the temporary initial position and the compensation angle, wherein
the first voltage command includes a d-axis component and a q-axis component that are measured at a predetermined speed interval within the predetermined speed range, and
the second voltage command includes a d-axis component and a q-axis component that are measured at a predetermined speed interval within the predetermined speed range.

5. The electronic device of claim 4, wherein the processor executes the at least one instruction to calculate the variation by cancelling a voltage error component and a voltage drop component of each of the first voltage command and the second voltage command.

6. The electronic device of claim 4, wherein the compensation angle is calculated based on a difference between a variation of the d-axis component of the first voltage command and a variation of the d-axis component of the second voltage command and a difference between a variation of the q-axis component of the first voltage command and a variation of the q-axis component of the second voltage command.

7. A non-transitory computer readable medium comprising computer-executable instructions that, when executed by a processor, cause the processor to:

fix a temporary rotor position of a motor to 0 degrees;
apply current to an axis of the motor;
drive the motor at a predetermined frequency;
determine whether a current rotor position of the motor is between zero and a predetermined value;
when the current rotor position of the motor is determined to not be between zero and the predetermined value:
   determine a frequency for driving the motor to be lower than the predetermined frequency, drive the motor at the frequency for driving the motor, and re-determine whether a current rotor position of the motor is between zero and the predetermined value; and
when a current rotor position of the motor is between zero and the predetermined value:
   fix again a current rotor position to 0 degrees;
   estimate a temporary initial position, which is an error between a position sensor and the rotor, based on an output value of the position sensor provided to the motor;
   measure a first voltage command output by performing speed control within a predetermined speed range based on a forward direction of a motor based on the temporary initial position,
   measure a second voltage command output by performing speed control within the predetermined speed range based on a reverse direction of the motor based on the temporary initial position,
   calculate a variation of each of the first voltage command and the second voltage command according to the speed control and calculate a compensation angle for the temporary initial position based on the variation, and
   calculate an initial position of the rotor based on a sum of the temporary initial position and the compensation angle, wherein
      the first voltage command includes a d-axis component and a q-axis component that are measured at a predetermined speed interval within the predetermined speed range, and
      the second voltage command includes a d-axis component and a q-axis component that are measured at a predetermined speed interval within the predetermined speed range.

* * * * *